United States Patent [19]
Edmonds, Jr.

[11] 3,867,189

[45] Feb. 18, 1975

[54] IMPERMEABLE, NONPOROUS POLYARYLENE SULFIDE LAMINATE AND PROCESS THEREFOR

[75] Inventor: James T. Edmonds, Jr., Bartlesville, Okla.

[73] Assignee: Phillips Petroleum Company, Bartlesville, Okla.

[22] Filed: Jan. 29, 1973

[21] Appl. No.: 327,733

[52] U.S. Cl. ......... 117/138.8 UA, 117/21, 117/18, 117/94, 161/160, 161/182, 161/205, 260/2.5, 264/255, 264/309
[51] Int. Cl. ................... C08d 13/24, B28b 7/28
[58] Field of Search.............. 161/160, 167, 187; 260/2.6; 117/161 UH, 138.8 UA; 264/255, 309

[56] References Cited
UNITED STATES PATENTS

| | | | |
|---|---|---|---|
| 2,053,307 | 9/1936 | Wilson | 264/173 |
| 2,701,905 | 2/1955 | Sullivan | 264/309 X |
| 3,354,129 | 11/1967 | Edmonds, Jr. et al. | 260/46.5 X |
| 3,520,749 | 7/1970 | Rubenstein | 156/244 X |
| 3,592,783 | 7/1971 | Edmonds, Jr. | 264/53 X |
| 3,616,186 | 10/1971 | Blackwell | 161/187 X |

Primary Examiner—George F. Lesmes
Assistant Examiner—Patricia C. Ives

[57] ABSTRACT

Lightweight, heat- and corrosion-resistant molded articles and process for preparing same by coating a porous poly(arylene sulfide) polymer molded composition with a poly(arylene sulfide) polymer are presented.

16 Claims, No Drawings

IMPERMEABLE, NONPOROUS POLYARYLENE SULFIDE LAMINATE AND PROCESS THEREFOR

This invention relates to novel, poly(arylene sulfide) molded articles. It further relates to a process for the production of novel, poly(arylene sulfide) molded articles.

In recent years polymeric materials have increasingly been utilized in applications where heretofore only metals have been utilized. For example, a wide variety of polymeric materials have been used in the manufacture of conduit. While in some applications metal conduit or pipe is preferred, for many other applications nonmetallic conduit is not only suitable, but is superior to the conventional metal pipe. Polymeric materials which have been utilized as conduit include polyethylene, polyvinyl chloride, ABS, polypropylene, rubber-modified styrene, polyvinyl dichloride, CPVC, cellulose acetate butyrate and the like. While conduit formed from the various polymeric materials has proven useful for many purposes, such conduit has limited utility due to its instability to heat and inability to carry high loads. Further, certain varieties of polymeric materials are subject to chemical attack at high temperatures.

Accordingly, it is an object of this invention to provide a lightweight, heat- and corrosion-resistant poly(arylene sulfide) laminate. Another object is to provide a process for producing an impermeable poly(arylene sulfide) molded article. A further object is to provide a lightweight, heat- and corrosion-resistant poly(arylene sulfide) conduit.

Other aspects, objects and several advantages of this invention will be apparent to those skilled in the art from consideration of the following disclosure and the appended claims.

In accordance with the present invention, it has been discovered that lightweight, heat- and corrosion-resistant molded articles can be prepared by the formation of a slurry of a poly(arylene sulfide) polymer in a volatilizable liquid, compressing the resulting slurry so as to form an integral molded composition therefrom, heating the resulting composition so as to substantially volatilize the residual liquid, thereafter additionally heating the resulting liquid-free composition at a second temperature, coating the molded article with a poly(arylene sulfide) polymer, heating the coated article at a third temperature and thereafter recovering the resulting nonporous, poly(arylene sulfide) molded article.

Polymers applicable to the practice of this invention are arylene sulfide polymers, including polymers and copolymers of the type which are prepared as described in U.S. Pat. No. 3,354,129, issued Nov. 21, 1967 to Edmonds and Hill. As disclosed in that patent, these polymers can be prepared by reacting at least one polyhalo-substituted cyclic compound containing unsaturation between adjacent ring atoms and wherein the halogen atoms are attached to the ring carbon atoms with a mixture in which at least one alkali metal sulfide is contacted with at least one polar organic compound selected from amides and sulfones. The resulting polymer contains the aromatic structure of the polyhalo-substituted compound coupled in repeating units through the sulfur atom. The polymers which are preferred for use in this invention are those polymers having the repeating unit $+R - S+_x$ wherein R is phenylene, biphenylene, naphthalene, biphenyleneoxy or a lower alkyl-substituted derivative thereof. By "lower alkyl" is meant alkyl groups having 1–6 carbon atoms such as methyl, ethyl, propyl, isobutyl, n-hexyl and the like. Such polymers are desirable because of their high stability. Such polymers are characterized by their ability to be converted to crosslinked polymers upon heating and by their passing through a fluid state prior to crosslinking.

The polymers which are useful in the practice of this invention are preferably those which have melting temperatures above 200°C. These arylene sulfide polymers can have melting temperatures in the range of 200°–500°C.

In a presently preferred embodiment the poly(arylene sulfide) polymer is polyphenylene sulfide. Phenylene sulfide polymers normally have melting temperatures in the range from about 275°–500°C. In a preferred embodiment, the polyphenylene sulfide polymer is prepared by reacting p-dichlorobenzene with a mixture in which sodium sulfide is contacted with N-methyl pyrrolidone.

The particulate poly(arylene sulfide) polymer to be employed in the process of this invention should be of a particle size of 1 to 3,500 microns. Thus, following formation of the polymer, the resulting polymer can, if necessary, be reduced to the required particulate size by any means known in the art, such as grinding, ball milling and the like.

The porous composition can also contain conventional fillers such as alumina, titania, carbon black, aluminum carbide, and the like. These fillers can be present in amounts in the ratio of 0.1:1 to 10:1 of organic polymer to filler. In a presently preferred embodiment the filler is a particulate heat resistant material, such as asbestos, glass fibers and carbon fibers. The preferred amount of heat resistant material per unit of polymer is in the range of 0.5:1 to 5:1.

The volatilizable liquid can be any liquid which is substantially nonreactive with the other materials of the composition and which is volatilizable at the temperatures employed in carrying out the first heating step of the process without deleterious decomposition. Examples of such suitable liquids are water, ethanol, methanol, 2-propanol, hexane, ethylene glycol, acetone, xylene, tetrahydrofuran, tetrahydropyran, 4-chloro-tetrahydropyran, and the like, as well as mixtures thereof. In a presently preferred embodiment, the volatilizable liquid is water.

If desired, vacuum can be employed to promote the volatilization of any of these liquids. However, volatilization at atmospheric pressure is most feasible and generally employed.

Formation of the slurry in the volatilizable liquid can be by any means known to the art. One suitable means is by the use of a high-speed blender.

In keeping with the preferred process of this invention, following formation of a slurry of a particulate poly(arylene sulfide) polymer, optional filler, and volatilizable liquid, the resulting slurry is thereafter subjected to compression molding so as to form a compressed composition which contains at least 0.1 and preferably at least 2.0 to 70 weight percent, preferably 5–30 weight percent volatilizable liquid.

Any pressure which will allow at least this range of volatilizable liquid to remain in combination with the polymer and filler can be employed. However, at least sufficient pressure should be employed so that the compressed mass has sufficient integrity to remain intact through the remaining steps of the process. In general, molding pressures in the range of about 5,000 p.s.i.g. to about 50,000 p.s.i.g. are employed. However, greater or lesser pressures can be employed, if desired, so long as the requisite liquid content is provided and the composition has the required integrity for further processing.

Following molding, the resulting molded article is heated at a first temperature in the range of 0°C. to 230°C. for a time sufficient to substantially remove the residual liquid from the compressed mass. The specific temperature and pressure employed will of course be dependent upon the particular volatilizable liquid employed in the forming of the slurry. Heating is ordinarily carried out for a period of 10 minutes to 48 hours at atmospheric pressure.

Following the first heating stage whereby the volatilizable liquid is substantially removed from the compressed mass, the resulting substantially liquid-free mass is thereafter further heated at a second and higher temperature for a period of time so as to substantially cure the polymer.

The specific temperature and time to be employed will depend upon the particular poly(arylene sulfide) polymer to be cured but in any event should be sufficient to convert the organic polymer to a crosslinked polymer and must be sufficient to form a coherent mass.

In general, the poly(arylene sulfide) compositions are converted into crosslinked polymers by heating the compressed mass at a temperature in the range of about 250°C. to 500°C. for a time sufficient to render the material substantially crosslinked. Generally, heating for a time in a range of 10 minutes to 10 hours is adequate.

Optionally, in order to facilitate the curing process, curing aids such as sulfuric acid, aromatic disulfonyl halides, disulfonic acids, aromatic or aliphatic disulfuryl azides, chloronil and similar materials have been found useful. Such curing aids may be employed in amounts of 0.1 to 5 percent based upon the weight of volatilizable liquid present.

The composition following heating is substantially porous with interconnecting pore cavities.

Following the second heating stage, the molded article is coated with a poly(arylene sulfide) polymer to seal the porous surfaces of the conduit. The nonporous coating can be applied by any method known in the art such as by spray, fluidized bed, brush, electrostatic bed, electrostatic spray, flocking gun, flame spray and the like.

In a presently preferred embodiment the molded article in the form of a conduit is spray-coated with a poly(arylene sulfide) polymer. The spray-coating process utilizes conventional spray apparatus for applying the poly(arylene sulfide) polymer powder in a liquid suspension. Generally, when utilizing conventional spray techniques, the polymer particle size should be in the range of 1 to 75 microns. Immediately after application the liquid is driven off leaving a fine polymer coating on the surface of the molded article.

In a more preferred embodiment, the molded article is coated utilizing a fluidized bed technique, whereby a mass of poly(arylene sulfide) polymer having a particle size of 1 to 300 microns is rendered fluid-like by the passage of air or gas through the powder. The molded conduit is preheated, then dipped in the fluidized bed, which may be at room temperature or heated to an elevated temperature. A layer of the powder adheres to the conduit.

While an adhesion promoter is not required for the practice of this invention, the coating polymer can, of course, contain conventional additives such as antioxidants, UV stabilizers, and the like. Preferred coating polymer compositions contain polytetrafluoroethylene in addition to the poly(arylene sulfide). The polytetrafluoroethylene is present in an amount within the range of 5–20, preferably about 10, weight percent based upon the total weight of the coating composition.

Following the coating stage, the coated article is heated at a third and higher temperature for a period of time so as to substantially crosslink the coating polymer, thus sealing the porous surface of the article.

The specific temperature and time to be employed will depend upon the particular poly(arylene sulfide) polymer to be cured and the thickness of the sealing coat. The porous article is heat stable at the curing temperature and will retain its shape during the second and third curing cycles.

Additional coatings can be applied to the initial coating if desired, followed in each case by an additional curing period.

In a presently preferred embodiment, the coating polymer is polyphenylene sulfide.

The nonporous molded articles formed by this invention are particularly suitable for use in severely corrosive service at elevated temperatures.

The following examples are presented to further illustrate the invention.

EXAMPLE I

A total of 300 grams of polyphenylene sulfide polymer formed by the reaction of p-dichlorobenzene with a mixture in which sodium sulfide was contacted with N-methyl pyrrolidone was blended with 300 grams of fine asbestos floats and sufficient water to form a thick slurry.

The slurry was filtered and a portion of the resulting wet filter cake pressed into a pipe mold (2" O.D. × 1" I.D.) at a pressure of 2.5 tons.

The molded pipe was removed from the mold and dried for about 16 hours at 150°C. to volatilize the water. Thereafter the essentially water-free composition was heated at 370°C. for 2 hours in air.

A section of the resulting porous conduit was then coated with a nonporous coating of polyphenylene sulfide as follows:

The molded conduit was preheated for 1 hour at 370°C., then dipped for about 3 seconds in a fluidized bed of polyphenylene sulfide particles having a particle size of 1 to 300 microns. The resulting coated conduit was then heated one hour at 370° C. to cure the coating polymer. A second coat was applied and cured in like manner.

EXAMPLE II

The remainder of the slurry formed in Example I was molded, dried and cured as in Example I.

A section of the resulting porous conduit was then coated with a nonporous coating of polyphenylene sulfide as follows:

The molded conduit was spray coated with a mixture of polyphenylene sulfide having a particle size of 1 to 75 microns and water. The coated conduit was heated 30 minutes at 370° C. to cure the coating polymer. Two additional spray coats were applied and cured in like manner.

In each of the above examples, the resulting coatings were smooth and completely sealed the porous surface of the molded conduit.

It will be evident to those skilled in the art that various modifications can be made, or followed, in light of the foregoing disclosure and discussion, without departing from the spirit or scope thereof.

I claim:

1. An impermeable laminate structure comprising a molded porous arylene sulfide polymer composition having applied to the surface thereof a cross-linked nonporous arylene sulfide polymer coating.

2. A laminate structure according to claim 1 wherein said porous arylene sulfide polymer molded composition additionally contains therein a particulate heat-resistant material.

3. A laminate structure according to claim 2 wherein said porous arylene sulfide polymer and said particulate heat-resistant material are present in an amount in the ratio of 0.1:1 to 10:1 of polymer to heat-resistant material.

4. A laminate structure according to claim 2 wherein said heat-resistant material is asbestos.

5. A laminate structure according to claim 1 wherein said porous arylene sulfide polymer is polyphenylene sulfide.

6. A laminate structure according to claim 1 wherein said non-porous arylene sulfide polymer is polyphenylene sulfide.

7. A laminate structure according to claim 1 wherein said laminate is in the form of a conduit.

8. A laminate according to claim 7 wherein said coating is on at least one surface of said conduit.

9. A process of making a laminate structure which comprises
   a. forming a slurry of a porous arylene sulfide polymer in a volatilizable liquid;
   b. compressing the resulting slurry so as to form a molded article containing therein at least 0.1 weight percent residual volatilizable liquid;
   c. heating the resulting molded article at a first temperature so as to substantially volatilize the residual liquid therein;
   d. thereafter, further heating the resulting substantially liquid-free molded article at a second temperature so as to substantially cure the polymer;
   e. thereafter applying a continuous layer of a nonporous arylene sulfide polymer to at least one surface of said molded article;
   f. thereafter, further heating the resulting coated article at a third temperature so as to substantially cure the coating polymer; and
   g. thereafter recovering the resulting laminate structure containing poly(arylene sulfide) composition as a product of the process.

10. A process according to claim 9 wherein said porous arylene sulfide polymer has additionally combined therewith a particulate heat-resistant material.

11. A process according to claim 9 wherein the porous arylene sulfide polymer is polyphenylene sulfide.

12. A process according to claim 9 wherein the nonporous arylene sulfide polymer is polyphenylene sulfide.

13. A process according to claim 9 wherein the volatilizable liquid is water.

14. A process according to claim 10 wherein the heat-resistant filler composition is asbestos.

15. A process according to claim 9 wherein the porous molded article is coated by contacting said article with a arylene sulfide polymer in a fluidized bed.

16. A process according to claim 12 wherein the nonporous arylene sulfide polymer additionally contains therein 5 to 20 weight percent polytetrafluoroethylene.

* * * * *